United States Patent [19]

Yamashita et al.

[11] Patent Number: 5,475,674
[45] Date of Patent: Dec. 12, 1995

[54] DISC CASE FOR REMOVABLY HOUSING DATA DISCS

[75] Inventors: Yuzo Yamashita; Shuji Taniguchi, both of Aichi, Japan

[73] Assignee: Hokko Kabushiki Kaisha, Aichi, Japan

[21] Appl. No.: 284,900

[22] Filed: Aug. 2, 1994

[30] Foreign Application Priority Data

Feb. 28, 1994 [JP] Japan ..................................... 6-055242

[51] Int. Cl.⁶ .................................................. G11B 23/03
[52] U.S. Cl. .......................... 369/291; 369/289; 360/133
[58] Field of Search ..................................... 369/291, 77.2, 369/289, 292; 360/133; 206/309–310

[56] References Cited

U.S. PATENT DOCUMENTS

| | | | |
|---|---|---|---|
| 5,140,489 | 8/1992 | Barnard ..................................... | 360/133 |
| 5,208,802 | 5/1993 | Suzuki et al. ............................ | 369/289 |
| 5,293,293 | 3/1994 | Iwafa et al. .............................. | 360/133 |
| 5,331,627 | 7/1994 | Childers et al. ......................... | 369/291 |

FOREIGN PATENT DOCUMENTS

| | | | |
|---|---|---|---|
| 2-128388 | 5/1990 | Japan ..................................... | 369/291 |
| 4-67486 | 3/1992 | Japan ..................................... | 369/291 |
| 6-139741 | 5/1994 | Japan ..................................... | 369/291 |

*Primary Examiner*—Stuart S. Levy
*Assistant Examiner*—Paul J. Ditmyer

*Attorney, Agent, or Firm*—Koda and Androlia

[57] ABSTRACT

Disclosed is a disc case characterized in that it allows both loading of the disc as housed in the case main body to the disc drive section and loading of the disc as a simple to the disc drive section, that it is produced with the reduced number of parts and reduced number of assembly steps so as to achieve cost reduction and enjoys extended life and high reliability, and that the opening and closing handleability of the cover is highly facilitated; the disc case comprising a rectangular case main body, having a full-face opening for fitting a data recording disc therethrough, and another opening defined at the bottom through which the data recording surface of the disc can radially be exposed; a cover plate which can close the full-face opening of the case main body; a couple of first engagement pieces, provided on the rear surface of the cover plate; a couple of second engagement pieces, provided in the case main body which resiliently engage with the first engagement pieces to lock the cover plate as closed with respect to the case main body; a protect case having a full-face opening for removably fitting the case main body therethrough; and a couple of resiliently shiftable portions formed on each lateral side wall thereof to be flexible inward, and provided with protrusions respectively at the positions close to the locations of the corresponding second engagement pieces when the case main body is fitted in the protect case; wherein these protrusions are designed to shift the second engagement pieces to be disengaged from the first engagement pieces when the resiliently shiftable portions are pushed and flexed inward to let the cover plate open with respect to the case main body.

1 Claim, 8 Drawing Sheets ns5,475,674

DISC CASE FOR REMOVABLY HOUSING DATA DISCS

BACKGROUND OF THE INVENTION

1. Field of the Invention

This invention relates to a disc case in which a data recording disc capable of reading and writing of magnetic data or optical data can removably be housed, more particularly to a disc case which can optionally be employed in a data processing unit such as a computer etc. in accordance with the specifications of the disc drive section thereof, allowing (1) loading of the disc as a simple to the disc drive section and (2) loading of the disc as housed in the disc case to the disc drive section.

2. Description of the Related Art

Data processing units including computers and word processors are classified into those which carry out reading and writing of magnetic data and those which carry out reading and writing of optical data, and discs (diskettes) are suitably employed as the data recording media for such units. While so-called floppy discs, which are of soft sheet-like recording media housed in protecting jackets and so-called hard discs (optical memory discs), which are rigid disc-like recording media, are known as such discs, the optical memory discs are rather preferably employed because of their large capacities and low costs. The system of loading the latter hard disc into the disc drive section of the data processing unit includes (1) the tray system, in which the bare disc as a simple is as such loaded; and (2) the caddie system, in which the disc is preliminarily housed in a case main body and loaded together with the case main body. In the latter system in which the case main body having the disc housed therein is as such loaded, the data recording surface of the disc is allowed to be exposed through the opening defined in the case main body, enabling reading and writing of data by the head of the disc drive section. Incidentally, in the former system, in which the disc as a simple is loaded as such, the disc is designed to be housed in a simple transparent plastic case for the protection and management thereof during storage.

While there are two systems for loading the hard disc into the disc drive section, as described above, the formats in these systems are standardized respectively, so that there is no interchangeability between these two systems, i.e. the case main body having the disc housed therein cannot be loaded into the disc drive section of the tray system, whereas the disc as a simple cannot be loaded to the drive section of the caddie system. However, the computer software itself recorded in the disc can commonly be utilized in either of these systems, and thus the discs are often distributed as simples in the market dealing in such software. Accordingly, if a user of the caddie system data processing unit, in which the case main body is employed for loading the disc, wants to use the disc sold as a simple, he must put the disc in a predetermined case main body (adapter case) so as to establish interchangeability, under the present circumstances. For example, FIG. 11 explains the mechanism of interchangeability established between a data processing unit PU1 (tray system) in which a hard disc 50 as a simple is loaded and a data processing unit PU2 (caddie system) in which an adapter case 52 having the disc 50 housed therein is loaded. Namely, the disc 50 as a simple can be loaded to one data processing unit PU1 but not as such to the other data processing unit PU2 due to the difference in the formats. Thus, after the disc 50 is housed in the illustrated adapter case 52, the resulting adapter case 52 is loaded into the data processing unit PU2. The outer dimensions of the adapter case 52 is, of course, formatted such that it can be loaded to and unloaded from the disc drive section of the data processing unit UP2. An opening 52a is defined at the bottom of the adapter case 52, and the data recording surface of the disc 50 is designed to be exposed through this opening 52a.

A shutter 43 which can close the opening 52a is slidably disposed to the adapter case 52, as shown in FIG. 12, so as to prevent invasion of dust and inadvertent touch of the fingers or hands of operators. The shutter 43 is automatically opened when the adapter case 52 is loaded into the data processing unit PU2 to allow the read/write head provided in the disc drive section to face the data recording surface of the disc 50, while it is closed automatically upon ejection of the adapter case 52. Accordingly, while the shutter 43 has a built-in spring mechanism for normally closing the opening 52a, this mechanism generally consists of a number of parts and is assembled through many steps, leading to increased production cost of the entire adapter case 52, disadvantageously. Besides, troubles are liable to occur at the open/close mechanism of the shutter 43, making durability and reliability of the adapter case during extended use questionable. In addition, other problems on storage have been pointed out that the adapter case 52 can easily be damaged, since it is stored or carried as such with no protector, and that the shutter 43 can easily be opened by application of an external force.

Therefore, this invention is proposed in order to solve the above problems, and it is an objective of the invention to provide a disc case characterized in that it can allow both loading of the disc as housed in the case main body to the disc drive section and loading of the disc separated from the case as a simple to the disc drive section, that it is produced with the reduced number of parts and reduced number of assembly steps so as to achieve cost reduction and enjoys extended life and high reliability, and that the opening and closing handleability of the cover is highly facilitated.

SUMMARY OF THE INVENTION

In order to overcome the problems described above and attain the intended objects successfully, the disc case according to this invention comprises a rectangular case main body, having a full-face opening defined at the top through which a data recording disc can removably be housed, and another opening defined at the bottom through which the data recording surface of the disc can radially be exposed; a cover plate, pivotally supported on one end portion of the case main body by hinge members, which can close the full-face opening of the case main body; a couple of first engagement pieces, provided on the rear surface of the cover plate at the other end portion opposite to the hinged portion to be extended toward the case main body; a couple of second engagement pieces, provided in the case main body at the positions corresponding to the locations of the first engagement pieces when the cover plate is closed, which resiliently engage with the first engagement pieces to lock the cover plate as closed with respect to the case main body; a protect case having a full-face opening through which the case main body can removably be fitted; and a couple of resiliently shiftable portions formed on each lateral side wall of the protect case to be flexible inward, and provided with protrusions at the positions close to the corresponding second engagement pieces, respectively, when the case main body is fitted in the protect case; wherein the protrusions are designed to shift the second engagement pieces to release engagement with the first engagement pieces when the resiliently shiftable portions are pushed and flexed inward to let the cover plate open with respect to the case main body, thus enabling fitting in and picking up of the data recording disc to and from the case main body.

BRIEF DESCRIPTION OF THE DRAWINGS

The features of this invention that are believed to be novel are set forth with particularity in the appended claim. The invention, together with the objects and advantages thereof, may best be understood by reference to the following description of preferred embodiment taken in conjunction with the accompanying drawings in which:

DETAILED DESCRIPTION OF THE INVENTION

Figure 1:
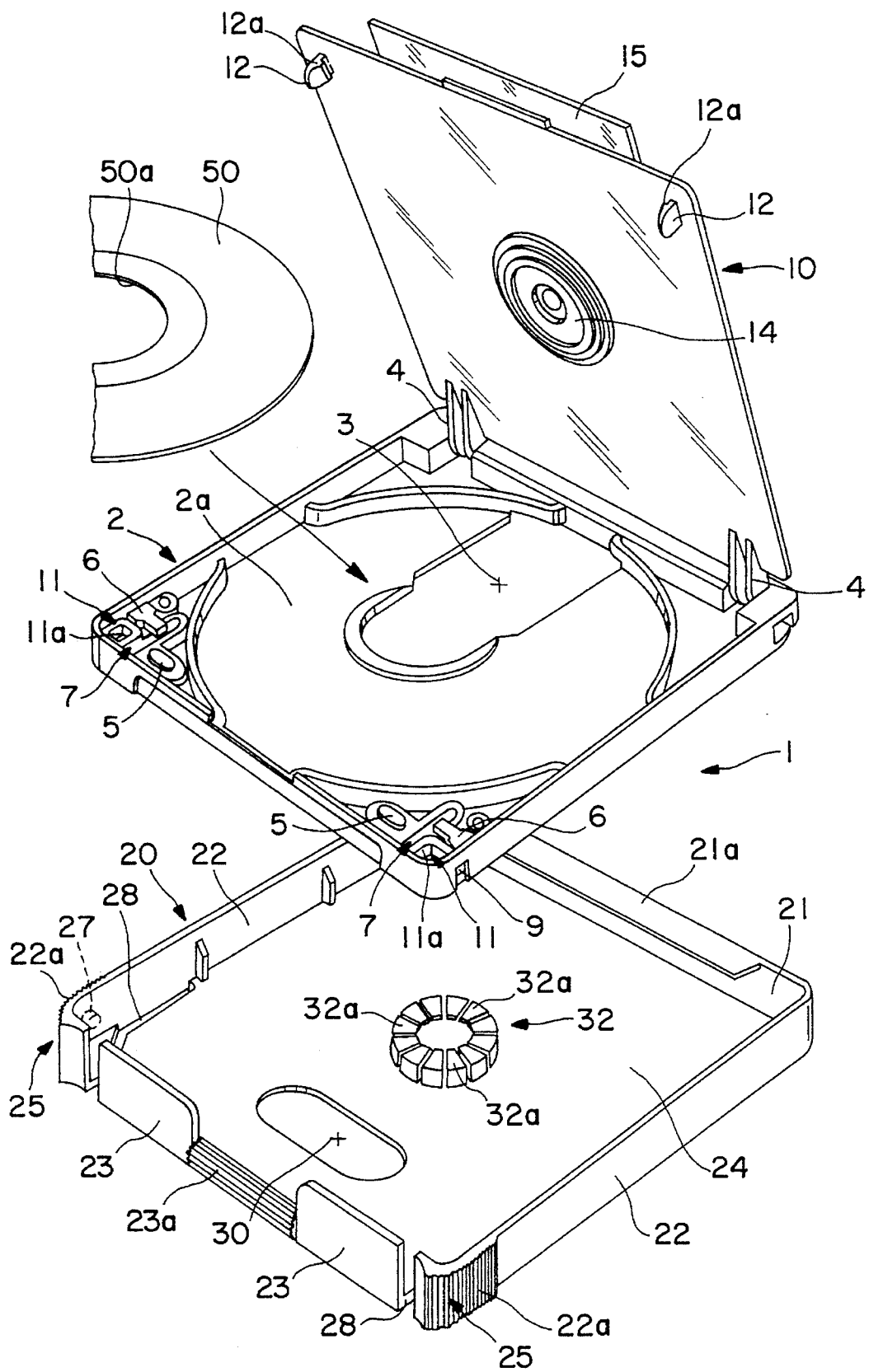
FIG. 1 is a schematic perspective view of the entire constitution of the disc case according to a preferred embodiment of the invention.
Figure 2:
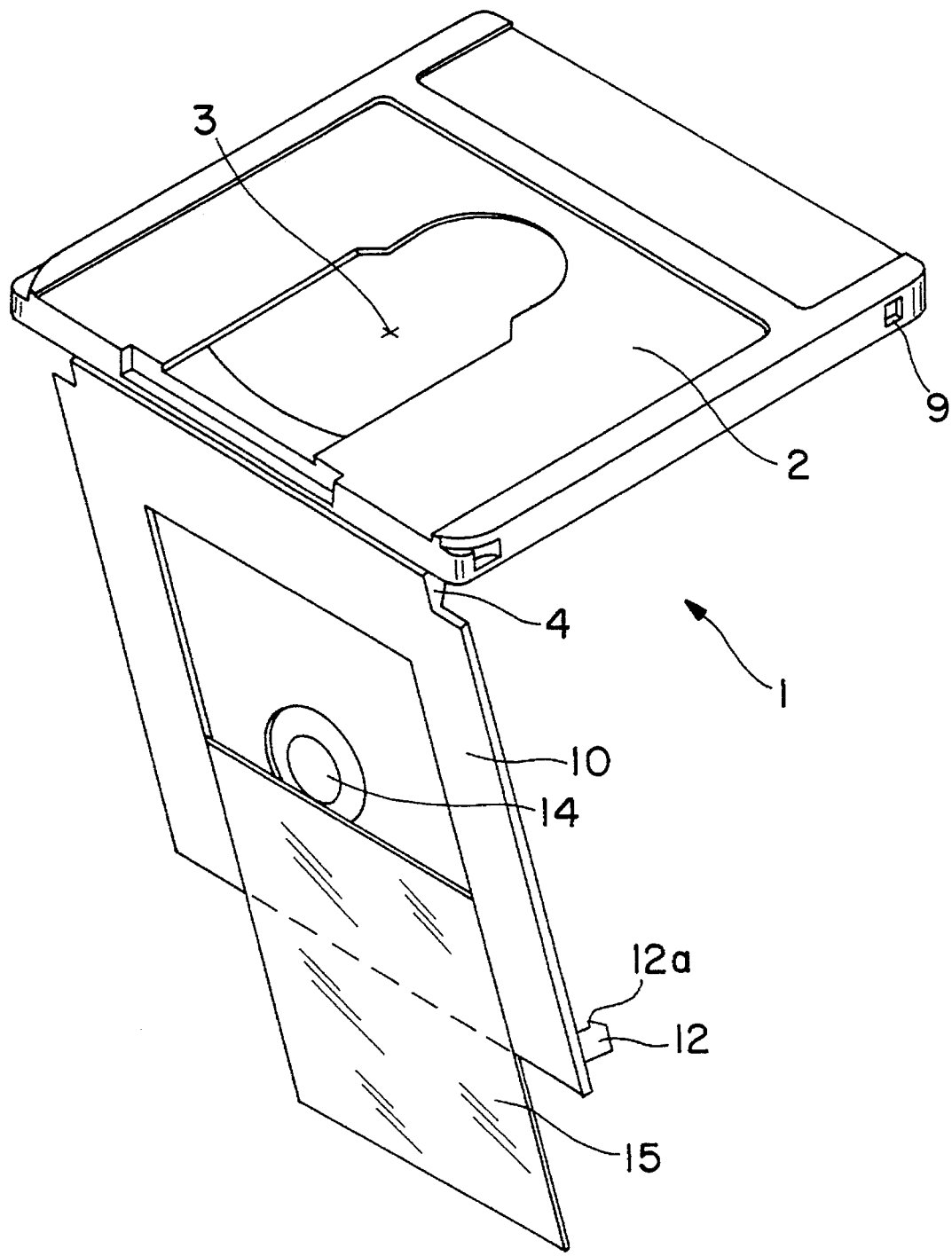
FIG. 2 is a perspective view of the rear side of the case main body with the cover plate being open.

The disc case according to this invention will be described below by way of a preferred embodiment referring to the attached drawings. FIG. 1 is a schematic perspective view of the entire constitution of the disc case 1 according to the embodiment of the invention, and FIG. 2 shows perspectively the rear side of the case main body 2 with the cover 10 being open. The disc case 1 of the embodiment essentially consists of a rectangular case main body 2 in which a disc 50 can removably be housed, a cover plate 10 which can freely open and close the full-face opening of the case main body 2 and a protect case 20 in which the case main body 2 can removably be fitted. The case main body 2 has a full face opening through which the disc 50 can removably be housed, and it also has an opening 3, through which the data recording surface of the disc 50 can be exposed radially, defined at the bottom 2a. One end portion of the cover plate 10 and that of the case main body 2 are pivotally supported by a couple of hinge members 4 so that the full-face opening of the case main body 2 may freely be closed therewith. The protect case 20 is of a thin container which is slightly greater than the case main body 2 and also has a full-face opening through which the case main body 2 can removably be fitted.

Figure 3:
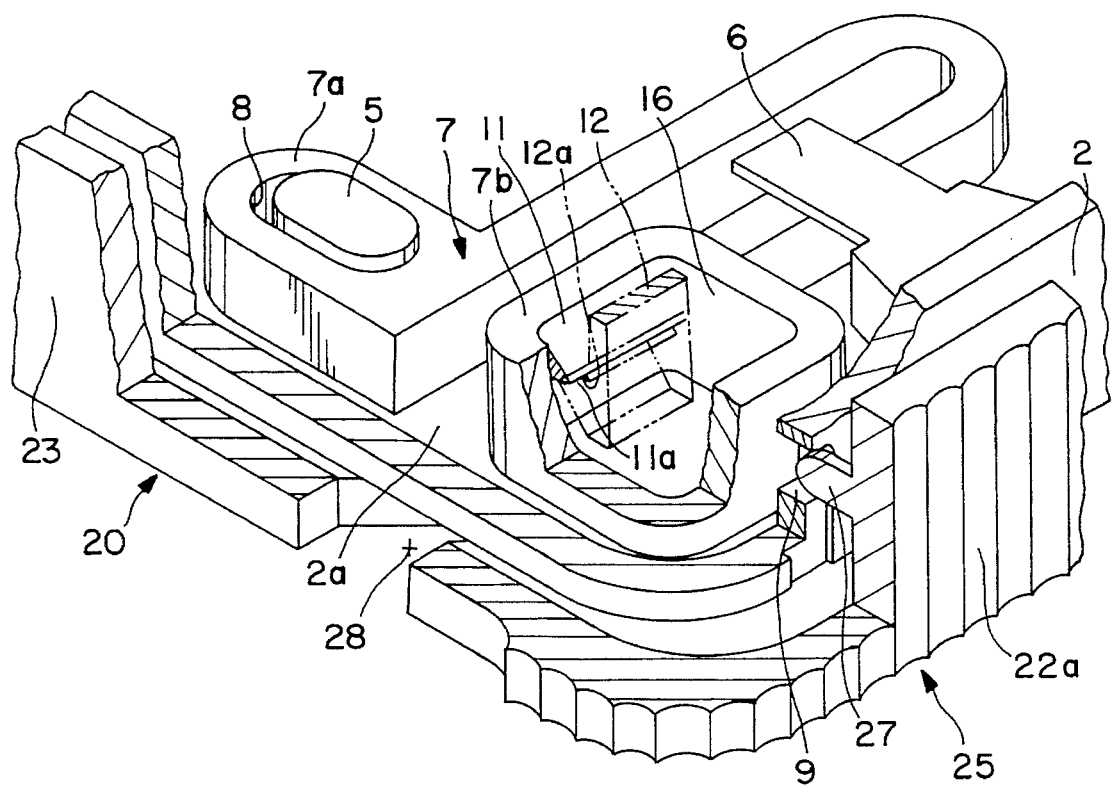
FIG. 3 is an enlarged partially cut-away perspective view showing the engagement state of a first engagement piece provided on the cover plate with a second engagement piece provided on the case main body.

A couple of first engagement pieces 12 are provided on the rear surface of the cover plate 10 with a predetermined span therebetween at the other end portion (opposite to that end portion which is pivotally supported by the hinge members 4), and these first engagement pieces 12 protrude toward the case main body 2. Meanwhile, a couple of second engagement pieces 11 are provided in the case main body 2 at the positions corresponding to the locations of the first engagement pieces 12 when the cover plate 10 is closed. The first engagement pieces 12 resiliently engage with the second engagement pieces 11 to lock the cover plate 10 closed (see FIG. 3). It should be noted here that each first engagement piece 12 has a hooked engagement portion 12a formed integrally therewith as shown in FIGS. 1 and 3. Meanwhile, each second engagement piece 11 is provided as a part of the structure shown in the enlarged view of FIG. 3. In other words, a couple of protrusions 5 are formed at the bottom 2a of the case main body 2 at the positions adjacent to the inner corners, respectively, with two urging pieces 7 each having a U-shape as a whole being separately provided on the case main body 2. In the illustrated embodiment, each urging piece 7 is attached to the case main body 2 by engaging the slot defined at one foot 7a of the U-shape with the corresponding protrusion 5. The other foot 7b of the U-shaped urging piece 7 has a rectangle-columnar shape, and second engagement piece 11 is integrally formed on the inner surface of the rectangular through hole 16 defined in the rectangle-columnar foot 7b. The second engagement pieces 11 also have hooked engagement portions 11a respectively at the positions such that they can be engaged with the hooked engagement portions 12a of the corresponding engagement pieces 12, when the cover plate 10 is closed with respect to the case main body 2. It should be noted that the main body of each urging piece 7 has a U-shape, and thus the hooked engagement portion 11a of the second engagement piece 11 and the hooked engagement portion 12a of the first engagement piece 12 are designed to have dimensions such that the former can normally be engaged with the latter, and that the engagement between these hooked engagement portions 11a and 12a may be released when the urging piece 7 is pushed to be flexed in the direction indicated by the arrow in FIG. 6 (as will be described later). Further, the reference number 6 indicated in FIGS. 1 and 3 denotes holding pieces which are extended horizontally from the inner surfaces of the lateral side walls of the case main body 2, and these holding pieces 6 serve to hold the U-shaped portions of the corresponding urging pieces 7 downward to prevent the urging pieces 7 from slipping out of position. Further, as apparently shown in FIG. 3, notches 9 having a predetermined size are defined in the lateral side walls of the case main body 2 at the positions adjacent to the corresponding rectangle-columnar feet 7b. These notches 9 allow intrusion of protrusions 27 (to be descried later) provided on the inner surfaces of the lateral side walls of the protect case 20.

Figure 4:
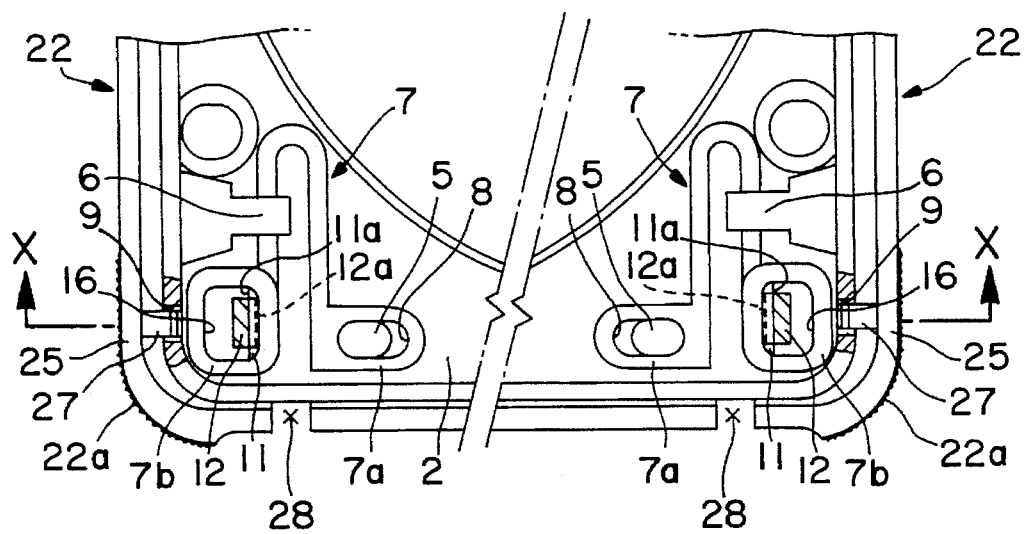
FIG. 4 shows partially in cross section a plan view of the engagement state of the first engagement pieces provided on the cover with the second engagement pieces provided on the case main body which is put in a protect case.

Now referring to the protect case 20, it has four side walls 21,22,23 rising from its rectangular bottom 24, as shown in FIG. 1. Namely, the side wall 21 corresponding to the one standing from the rear part in FIG. 1 has a hood 21a extending from the upper edge thereof horizontally inward, which serves as the guide when the case main body 2 is fitted into the protect case 20 and also as a stopper, as will be described later referring to FIG. 10. The side wall 23 standing from the front side of the rectangular bottom 24 is slightly notched downward at the middle, and a horizontally knurled non-slip member 23a is formed therein. Meanwhile, the opposing side walls 22 standing from the right side and left side of the rectangular bottom 24 in FIG. 1 are provided with vertically knurled non-slip members 22a at the outer front end portions, respectively. Further, a couple of slits 28 (a right slit and a left slit) are defined at the bottom 24 to extend from the front side with a predetermined length toward the depth of the protect case 20 whereby to allow the non-slip members 22a to flex toward the inside of the protect case 20 and function as resiliently shiftable portions 25. A horizontal protrusion 27 is provided at the inner surface of each resiliently shiftable portion 25, which protrusion 27 is inserted to the notch 9 provided at the corresponding position of the case main body 2, when the case main body 2 is fully fitted in the protect case 20, to locate at the proximities of the corresponding second engagement pieces 11 formed on the U-shaped urging pieces 7, respectively, as shown n FIGS. 3 to 5.

Figure 5:
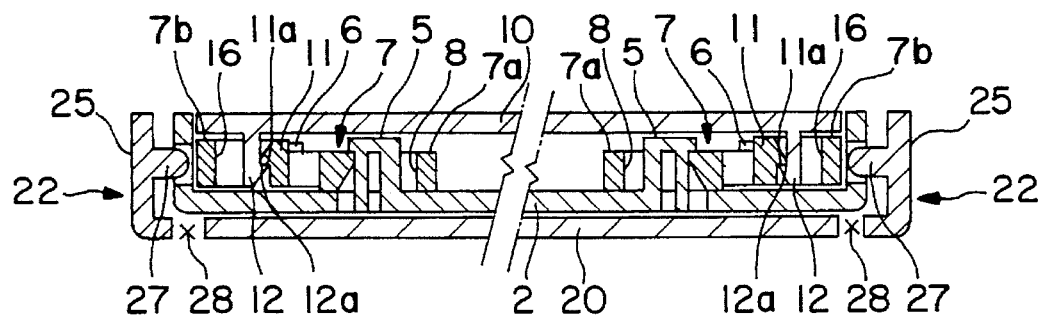
FIG. 5 is the cross section taken along the line X—X in FIG. 4.
Figure 7:
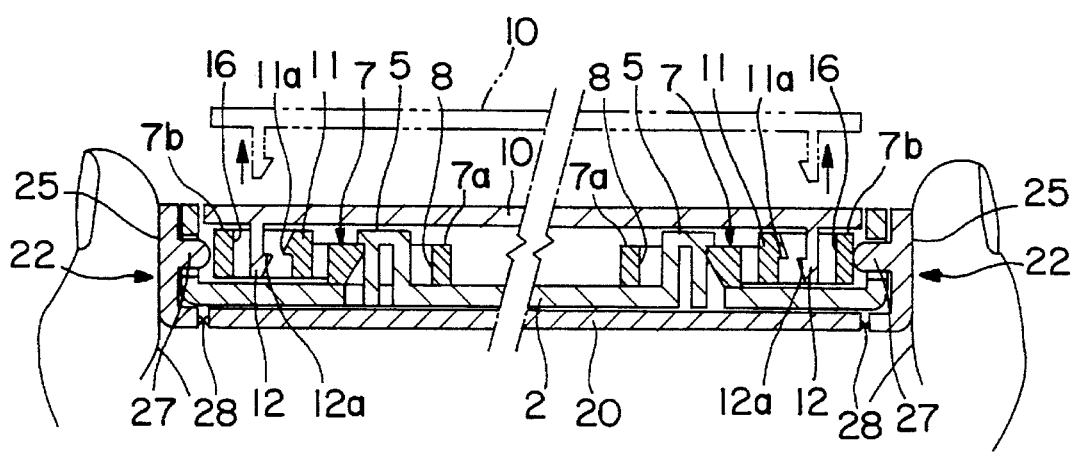
FIG. 7 is the cross section taken along the line Y—Y in FIG. 6.

Namely, when the case main body 2 is fitted in the protect case 20, the hooked engagement portions 11a of the second engagement pieces 11 engage with the hooked engagement portions 12a of the corresponding first engagement pieces 11 to lock the cover plate 10 with respect to the case main body 2, as shown in FIG. 5. However, if the right and left resiliently shiftable portions 25 are pushed with fingers inward, these portions 25 flex inward to allow the protrusions 27 to urge the rectangle-columnar feet 7b of the urging pieces 7. Accordingly, due to the yielding of the urging pieces 7 to the urging force of the protrusions 27, the hooked engagement portions 11a are retracted from the hooked engagement portions 12a to release engagement therebetween, as shown in FIG. 7, and thus the cover plate 10 can easily be let open with respect to the case main body 2. Incidentally, an oval opening 30 is defined at the bottom 24 of the protect case 20 at a position near the front end middle portion. This opening 30 is utilized for lifting the case main body 2 by inserting a finger of the user therethrough, when the case main body 2 is to be separated from the protect case 20.

Further, a holder 32 having a cylindrical form as a whole is formed at the center of the bottom 24 of the protect case 20. The holder 32 has a multiplicity of radial slits to form a plurality of engagement pieces 32a which can undergo resilient deformation in the radial direction. This holder 32 is resiliently fitted in the central opening of the disc 50 housed in the case main body 2 as fitted in the protect case 20 to hold the disc 50 stably thereby. When the disc 50 is to be picked up, the upper surface of the holder 32 is pushed with finger, and thus the engagement pieces 32a undergo resilient deformation radially inward to allow easy picking up of the disc 50.

Meanwhile, as shown in FIG. 1, a hub 14 for chucking the disc 50 is provided at the substantially central position (corresponding to the center of the disc 50 housed therein) of the cover plate 10. A transparent rectangular plate 15 having a predetermined dimensions is removably fitted on the upper surface of the cover plate 10, as shown in FIG. 2, so that a label on which the title and other data can be written may be inserted between the transparent plate 15 and the upper surface of the cover plate 10. Incidentally, the transparent plate 15 is adapted to be removable only when the cover plate 10 is open with respect to the case main body 2, and not when the cover plate 10 is closed, since the cover plate 10, when closed, is designed to be abutted against the front edge of the case main body 2.

Figure 6:
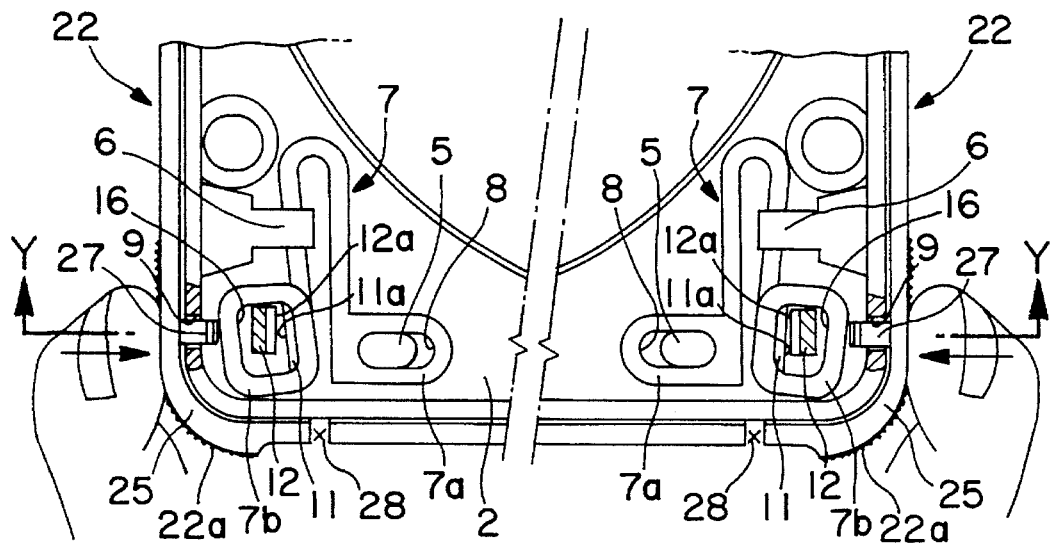
FIG. 6 shows in partial cross section a plan view of the disengagement state of the first engagement pieces provided on the cover plate from the second engagement pieces provided on the case main body which is put in a protect case.
Figure 8:
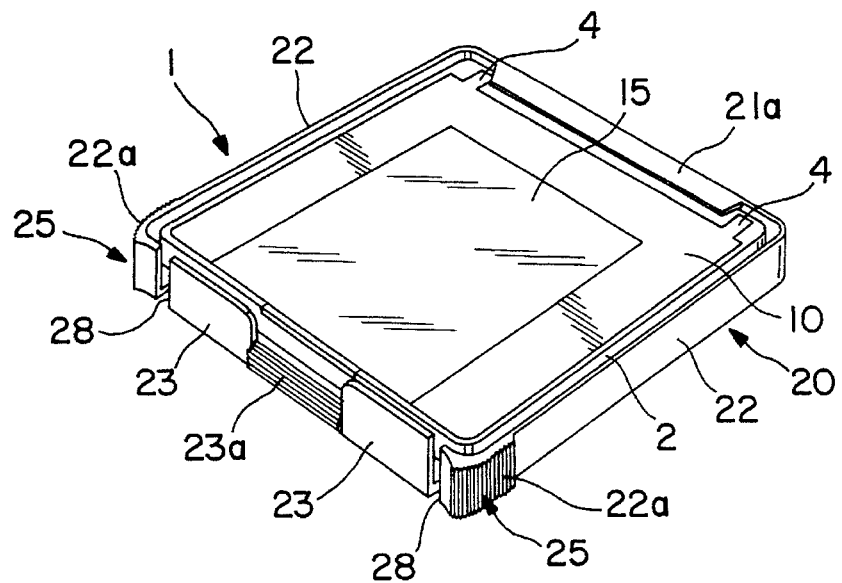
FIG. 8 is a perspective view of the case main body put in the protect case.
Figure 9:
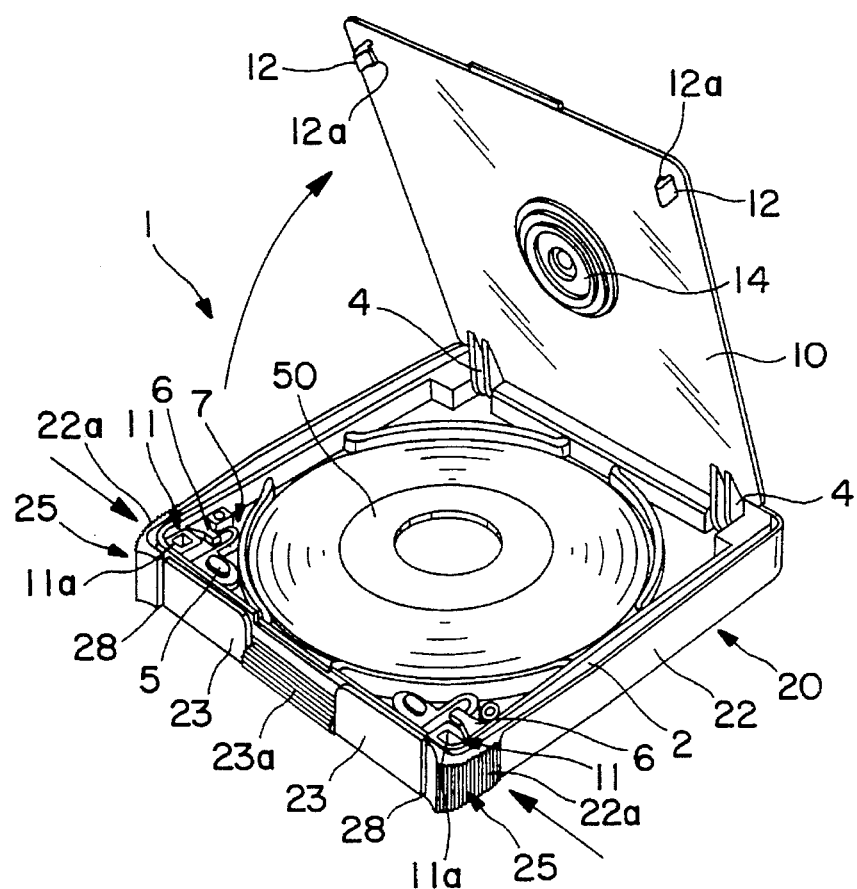
FIG. 9 is a perspective view of the case main body put in the protect case with the cover plate being open with respect to the case main body.
Figure 10:
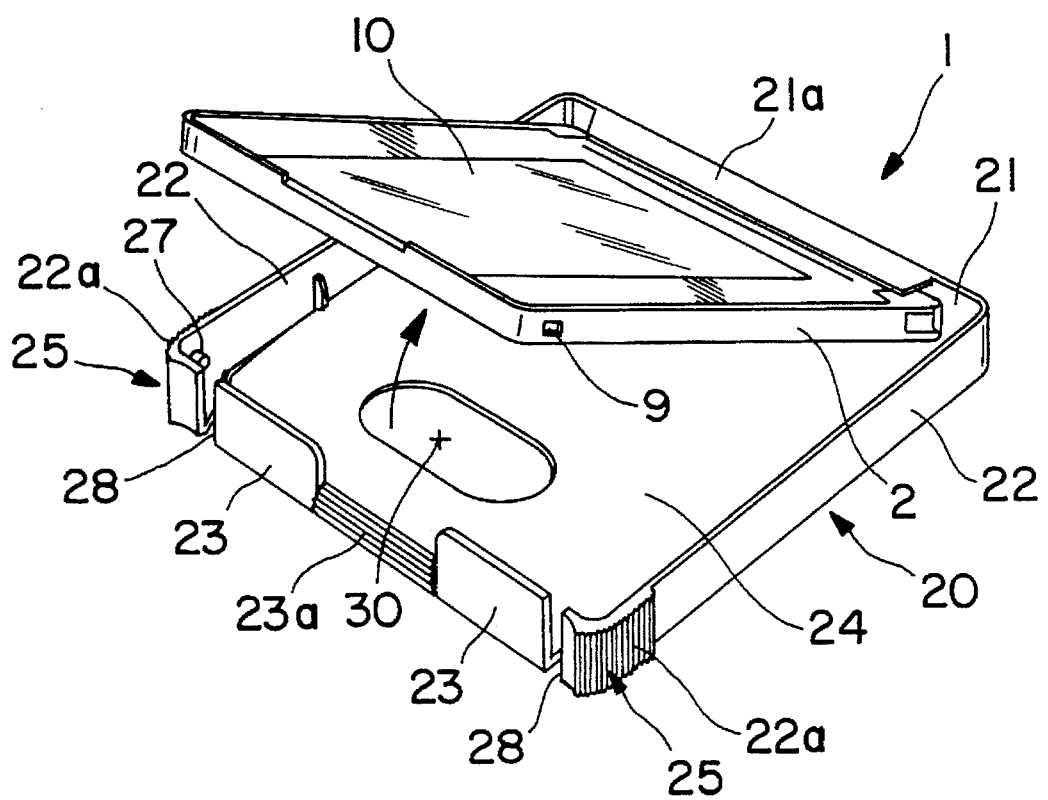
FIG. 10 shows the state where the case main body is being separated from the protect case.
Figure 11:
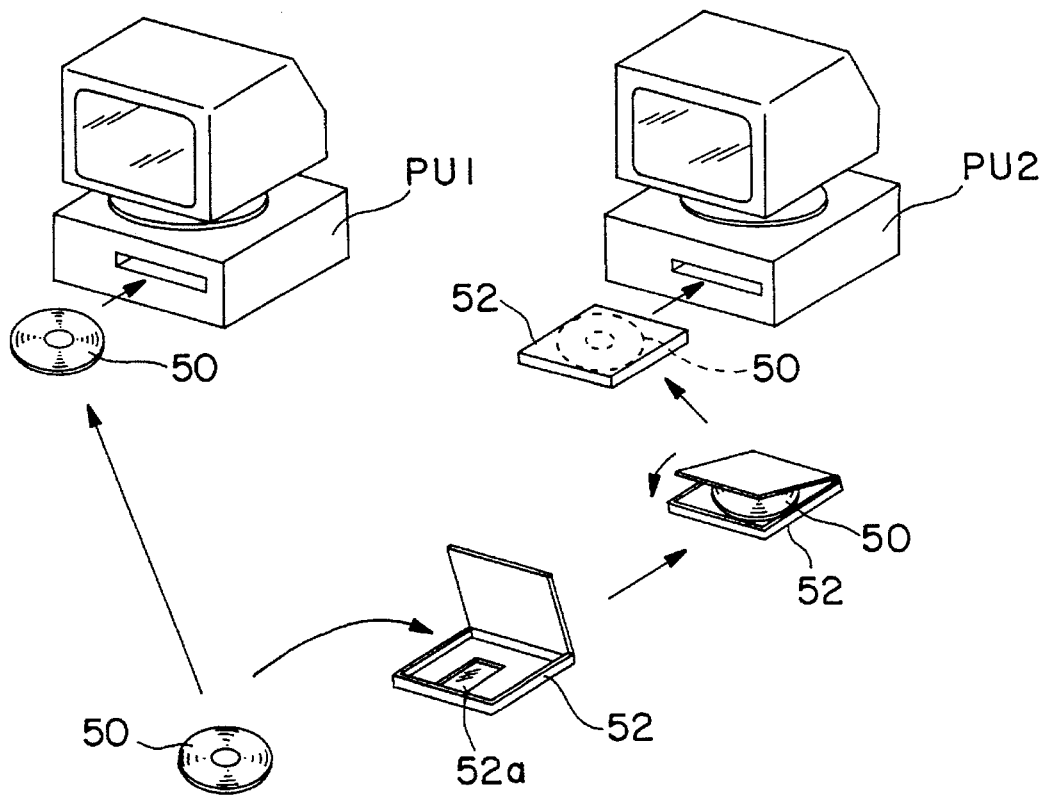
FIG. 11 shows the mechanism of imparting interchangeability to the discs between a data processing unit to which the hard disc as a simple is loaded and a data processing unit to which an adapter case having the hard disc housed therein is loaded.
Figure 12:
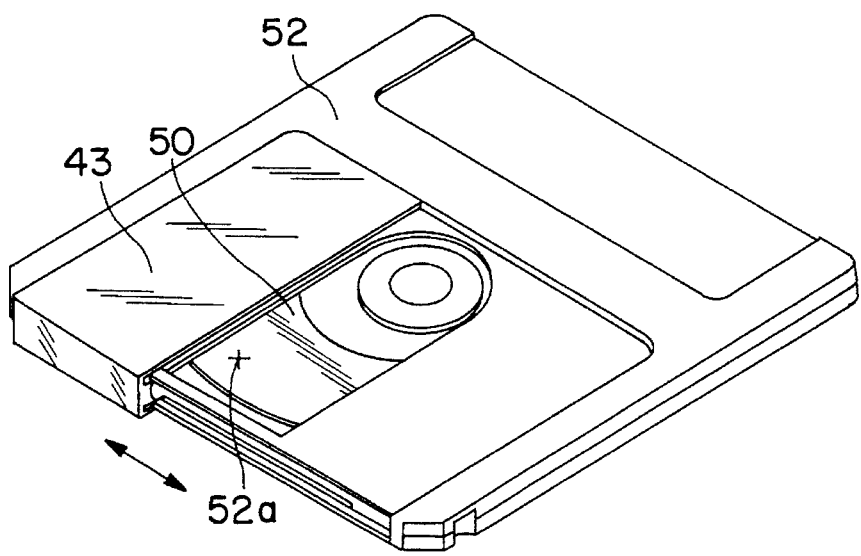
FIG. 12 is a schematic explanatory view of the conventional adapter case having a disc housed therein.

Next, the procedures of using the disc case according to the embodiment will be described. FIG. 8 shows a state where the case main body 2 is fitted in the protect case 20, provided that a disc 50 is preliminarily housed in the case main body 2. In order to pick up the disc 50 from the disc case 1, the right and left resiliently shiftable portions 25 of the protect case 20 are pushed inward with fingers, as shown in FIG. 6. Thus, the resiliently shiftable portions 25 flex inward to let the U-shaped portions of the urging pieces 7 flex by the protrusions 27, whereby the engagement between the hooked engagement portions 12a and the hooked engagement portions 11a is released (see FIG. 7). Accordingly, as shown in FIG. 9, the cover plate 10 can be let open with respect to the case main body 2 to enable picking up of the disc 50 therefrom. Namely, the disc 50 can easily be picked up from the case main body 2 as the latter is fitted in the protect case 20. The disc 50 picked out of the disc case 1 can be used in the data processing unit PU 1 of the format which allows loading of the disc as a simple, as described referring to FIG. 11. Meanwhile, when the case main body 2 is to be separated from the protect case 20, it can be separated by simple procedures: the user puts one of his fingers in the opening 30 defined at the bottom 24 of the protect case 20 to push up the case main body 2, as shown in FIG. 10. The case main body 2 thus separated can be used in the data processing unit PU2 of the format which allows loading of the case main body 2, as described referring to FIG. 11, with the hooked engagement portions 11a of the second engagement pieces 11 engaging with the hooked engagement portions 12a of the first engagement pieces 12 to unopenably lock the cover plate 10 with respect to the case main body 2.

On the contrary, when the disc 50 is to be housed into the case main body 2, the disc 50 is set in position in the case main body 2 with the cover plate 10 being let open, as shown in FIG. 9. When the cover plate 10 is closed with respect to the case main body 2, the first engagement pieces 12 provided on the rear surface of the cover plate 10 are inserted to the corresponding rectangular through holes 16 of the urging pieces 7 provided on the case main body 2. Then, the hooked engagement portions 11a of the second engagement pieces 11 provided on the inner surfaces of the rectangular through holes 16 resiliently engage with the hooked engagement portions 12a of the first engagement pieces 12 to unopenably lock the cover plate 10 with respect to the case main body 2. When the case main body 2 having the disc 50 housed therein is to be fitted in the protect case 20, the procedures described referring to FIG. 10 may be repeated reversely. Namely, after the rear end portion of the case main body 2 is slipped immediately under the hood 21a extended from the upper edge of the side wall 21 of the protect case 20, the upper surface of the case main body 2 is pushed downward to allow the notches defined on the lateral side walls of the case main body 2 to catch the protrusions 27 provided on the inner surfaces of the lateral side walls of the protect case 20. Thus, the case main body 2 can securely be fitted in the protect case 20.

Although one embodiment of the present invention has been described herein, it should be apparent to those skilled in the art that the present invention may be embodied in many other specific forms without departing from the spirit or scope of the invention. Therefore, the present embodiment is to be considered as illustrative and not restrictive, and the invention is not to be limited to the details given herein, but may be modified within the scope of the appended claims.

What is claimed is:

1. A disc case comprising:

a rectangular case main body, having a full-face opening defined at the top through which a data recording disc can removably be housed, and another opening defined at the bottom through which the data recording surface of said disc can radially be exposed;

a cover plate, pivotally supported on one end portion of said case main body by hinge members, which can close said full-face opening of said case main body;

a couple of first engagement pieces, provided on the rear surface of said cover plate at an end portion of said cover plate opposite to a hinge portion to be extended toward the case main body;

a couple of second engagement pieces, provided in the case main body at positions corresponding to locations of said first engagement pieces when said cover plate is closed, which resiliently engage with said first engagement pieces to lock said cover plate as closed with respect to said case main body;

a protect case having a full-face opening through which said case main body can removably be fitted; and a couple of resiliently shiftable portions formed on each lateral side wall of said protect case to be flexible inward, and provided with protrusions at positions close to corresponding second engagement pieces, respectively, when said case main body is fitted in said protect case;

wherein said protrusions shift said second engagement pieces to release engagement with said first engagement pieces when said resiliently shiftable portions are pushed and flexed inward to let said cover plate open with respect to said case main body, thus enabling fitting in and picking up of said data recording disc to and from said case main body.

* * * * *